WILLIAM M. FORCE.
Improvement in Cotton Seed Heaters.
No. 124,945. Patented March 26, 1872.
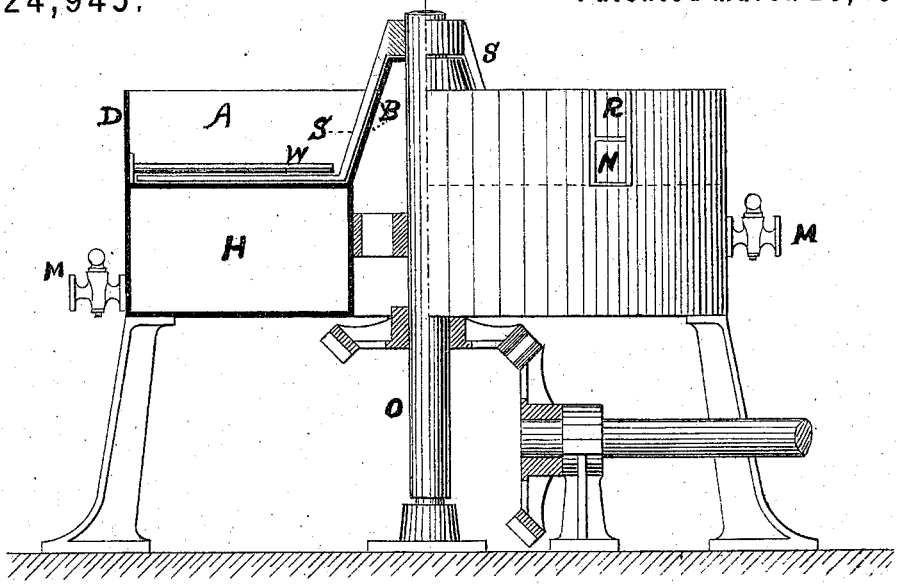
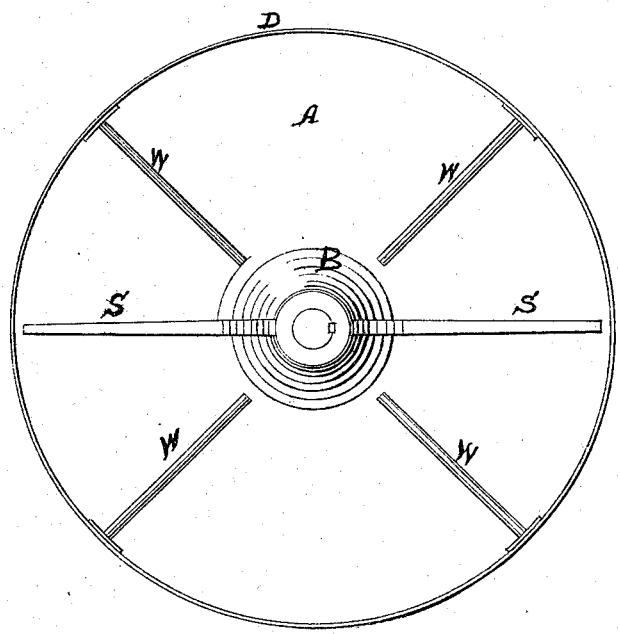
Fig. 2

124,945

UNITED STATES PATENT OFFICE.

WILLIAM M. FORCE, OF NEWARK, NEW JERSEY.

IMPROVEMENT IN COTTON-SEED HEATERS.

Specification forming part of Letters Patent No. 124,945, dated March 26, 1872.

*To all whom it may concern:*

Be it known that I, WILLIAM M. FORCE, of the city of Newark, county of Essex, in the State of New Jersey, have invented new and useful Improvements in Heaters and Evaporators for Treating Cotton-Seed; and I do hereby declare that the following is a full, clear, and exact description thereof, which will enable others skilled in the art to make and use my invention, reference being had to the accompanying drawing forming a part of this specification.

My invention consists in the improvement of certain combined devices for treating cotton-seed by heating the same and evaporating the excess of moisture, as hereinafter fully described and subsequently pointed out in the claim.

Referring to the drawing, Figure 1 is a view of my heater and evaporator, showing the cone-shaped center and rotating stirrers; also the port or outlet to allow the seed to pass out after being properly treated. Fig. 2 is a top view of the same.

To describe the construction more in detail, I make my heater and evaporator of wrought and cast iron principally, although other suitable materials may be used; and the size or capacity is not essentially definite, as by the peculiar construction and operation of the same it may be made to supply one or many presses. The reservoir A, with the cone B and the sides or rim D, is, by preference, made of sheet or boiler iron. The steam-chamber H may be made of the same or similar material and may be riveted or bolted together. The whole may rest upon legs, or any suitable foundation usually adopted in similar structures. The shaft O may be attached as shown in the drawing, or may be suspended and operated from above, the gearing not being necessary, as belting directly upon the shaft may be preferred by some operators. The rotating stirrers or arms S may be made of any suitable material—as iron or wood. The fixed or stationary brakes W may be made of any material, and secured in position by any known means usually adopted. The steam is admitted into the chamber by the usual connections of steam-pipe. The discharge-port N is made in the rim D, in size sufficient to discharge as rapidly as the seed is thoroughly treated. The discharge may be regulated by a gate, R.

To enable others to use the above invention, I will describe its operation.

I first admit steam into the chamber H to heat the surface or bottom of the reservoir sufficiently. The seed is then fed into a hopper automatically or by hand, and passing through the same falls upon the top of the cone or elevation in the center and from there into the space between the center elevation and the external rim where it encounters the rotating stirrers by which it is tumbled and turned continually. All the material is thus brought in contact with the heated surface and afterward rapidly exposed to the external air, by which the moisture is expelled partially or wholly.

To enable me more effectually to perform this operation I have constructed my evaporator in circular form; the cone or raised rim in the center being for the purpose of keeping the seed or meal at a sufficient distance from the center to prevent the formation of water-balls, or balls saturated with condensed steam, which are formed by the various processes now in use and prove so damaging to the quality of the cake. By feeding in at the center and passing the seed gradually from thence to the outer rim of the evaporator, where it is discharged automatically, the amount of labor attending the operation is greatly diminished when compared with other devices for a similar purpose.

The object of my invention is to more successfully and skillfully treat cotton-seed or meal for the press in such a manner that the cake or seed may be uniform and equal in quality at all times. As I have before mentioned the uneven tempering of the seed or meal and the accumulation of water-balls incident to other devices in use, causes, when pressed, hard and flinty masses in the cake that cannot be consumed in a desirable manner.

I would remark that material differences exist between the properties of cotton-seed and linseed, such differences relating chiefly to the amount of moisture contained in the two kinds of seed named, though prepared for the press by the same devices. For example, linseed requires moisture to be added, and cotton-seed requires much moisture to be evaporated.

By my peculiar combination I have made valuable improvements, as described above, which insures me a successful and thorough treatment of cotton-seed for the purposes described.

Having thus described my improvements, what I claim, and desire to secure by Letters Patent, is—

1. I claim the central cone or elevation B in combination with the evaporator A and stirrers S, substantially as specified.

2. In combination with the evaporator A, the stirrers S, and checks W, so arranged as to cause a constant change of the heated seed from the heated bed to the surface, substantially as and for the purpose specified.

WM. M. FORCE.

Witnesses:
JOHN DANE, Jr.,
J. H. CADY.